United States Patent [19]
Kobayashi

[11] Patent Number: 5,320,430
[45] Date of Patent: Jun. 14, 1994

[54] STROKE BEARING
[75] Inventor: Hirokazu Kobayashi, Kanagawa, Japan
[73] Assignee: Nippon Thompson Co., Ltd., Tokyo, Japan
[21] Appl. No.: 978,341
[22] Filed: Nov. 18, 1992
[30] Foreign Application Priority Data
Nov. 20, 1991 [JP] Japan .................. 3-329616
[51] Int. Cl.⁵ ............................................ F16C 31/04
[52] U.S. Cl. ........................................ 384/49; 384/30
[58] Field of Search .............. 384/49, 30, 52, 29, 384/50
[56] References Cited
U.S. PATENT DOCUMENTS
3,582,161 6/1971 Hudson .............................. 384/52
4,664,534 5/1987 Hanaway ............................ 384/30
5,158,373 10/1992 Hanaway ............................ 384/49

Primary Examiner—Lenard A. Footland
Attorney, Agent, or Firm—Sughrue, Mion, Zinn, Macpeak & Seas

[57] ABSTRACT

A stroke bearing is able to perform relative motion along a prescribed path by itself without requiring the providing of a stopping device that prevents a ball and cage assembly from falling out on the apparatus. In a stroke bearing having an outer sleeve and a shaft fit together by means of a ball and cage assembly, by, for example, fitting a bushing into said outer sleeve, providing a guide groove on this bushing, and having a pin make sliding contact with said guide groove, said stroke bearing is able to perform relative motion along a prescriber path. In addition, the ball and cage assembly can be easily prevented from falling out by a stop ring acting in the manner of a range limiting device that limits the range of said relative motion.

2 Claims, 6 Drawing Sheets

STROKE BEARING

BACKGROUND OF THE INVENTION

1. Field of the Invention

The present invention relates to a stroke bearing that can be used in devices performing repetitive relative motion such as industrial robots, office automation equipment and measuring instruments.

2. Description of the Prior Art

A known example of this type of stroke bearing is indicated in FIG. 1 and FIG. 2. As indicated in FIG. 1 and FIG. 2, this stroke bearing has ball and cage assembly 3 comprised by numerous rolling elements in the form of balls 1 arranged to rotate freely held by cage 2, and outer sleeve 4 and shaft 5 mutually engaged while allowed to slide and rotate freely by means of said ball and cage assembly 3. Furthermore, a device is suitably contrived that prevents said stroke bearing from coming out when installed in each of the above-mentioned apparatus so that ball and cage assembly 3 does not come out of outer sleeve 4 during this sliding.

In the stroke bearing having the above-mentioned constitution, for example, shaft 5 is moved back and forth or rotated with outer sleeve 4 being either fixed or movable. As a result, the apparatus in which said stroke bearing is incorporated performs smooth relative motion.

3. Problems that the Invention is to Solve

However, in the stroke bearing of the prior art, the degree of freedom of the relative operating states of the above-mentioned outer sleeve and shaft, since they are able to move freely in the axial and radial directions, is large. In the case of incorporating said stroke bearing in an apparatus such as a machine tool to operate in the manner of following, for example, a helical path of a moving part with respect to a stationary part, it is necessary to provide a separate guide mechanism to move said moving part along a helical path, thus resulting in the stroke bearing of the prior art having the disadvantage of leading to increased manufacturing costs for the apparatus. In addition, the stroke bearing of the prior art also has the disadvantage of having to separately provide a stopper device on the apparatus for preventing cage and ball assembly 3 from falling out.

SUMMARY OF THE INVENTION

In consideration of the above-mentioned disadvantages of the prior art, the object of the present invention is to provide a stroke bearing able to perform relative motion along a prescribed path by itself, and moreover, not require the providing of the above-mentioned stopper device on the apparatus for preventing ball and cage assembly 3 from falling out.

The stroke bearing pertaining to the present invention contains a guide device that guides an outer sleeve and a shaft so as to perform relative motion along a prescribed path in a stroke bearing comprising said outer sleeve, said shaft, balls and a cage wherein said outer sleeve and said shaft perform relative rolling motion in the axial and radial directions by means of said balls.

DESCRIPTION OF THE PREFERRED EMBODIMENTS

The following provides an explanation of an embodiment of the stroke bearing pertaining to the present invention with reference to the drawings.

Figure 1:
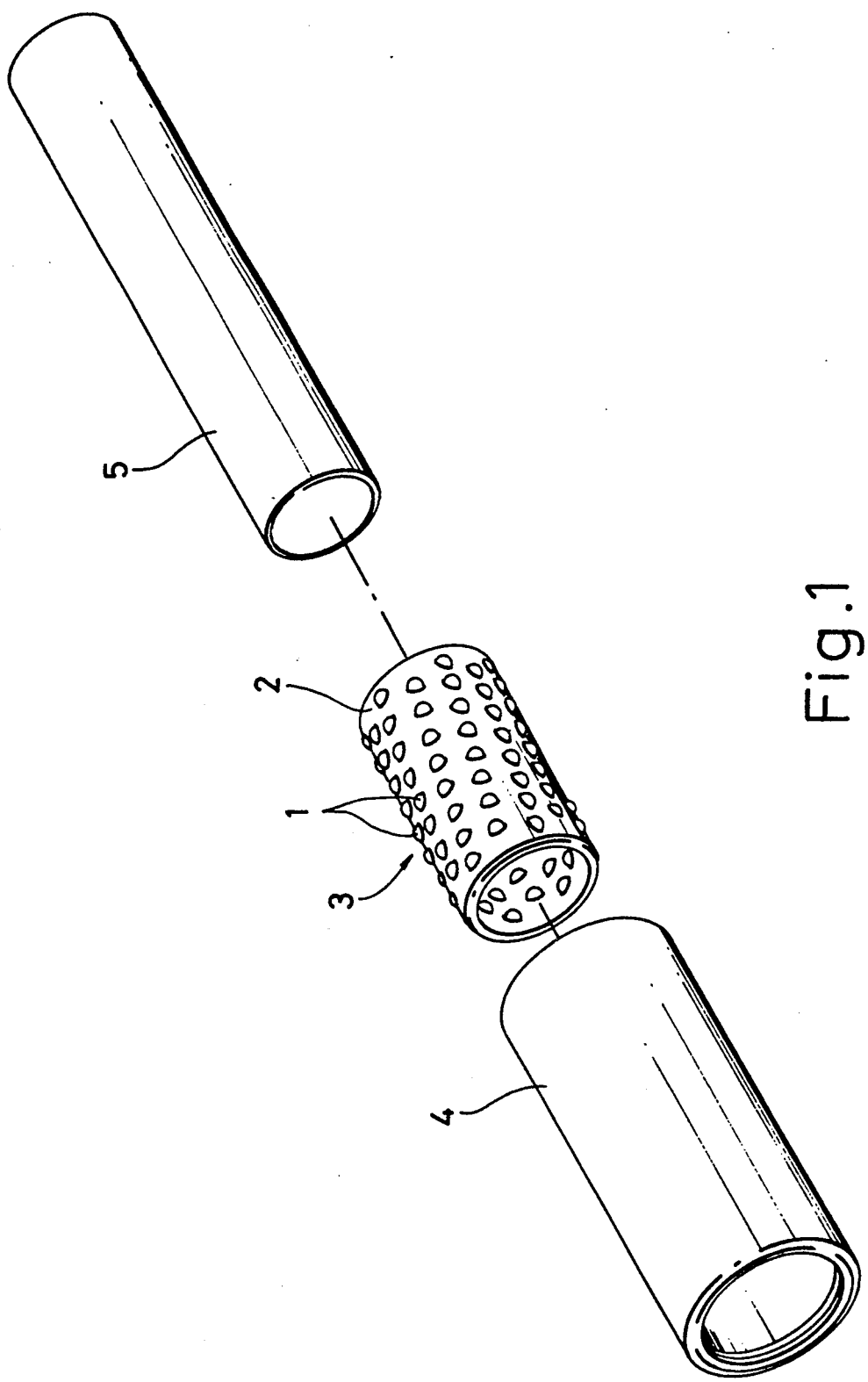
FIG. 1 is an exploded view of a conventional stroke bearing.
Figure 2:
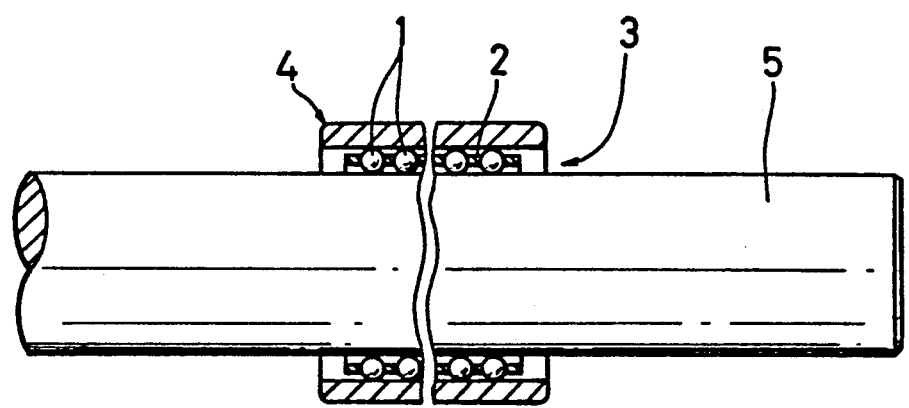
FIG. 2 is a lateral cross-sectional view of the essential elements of the stroke bearing indicated in FIG. 1.
Figure 3:
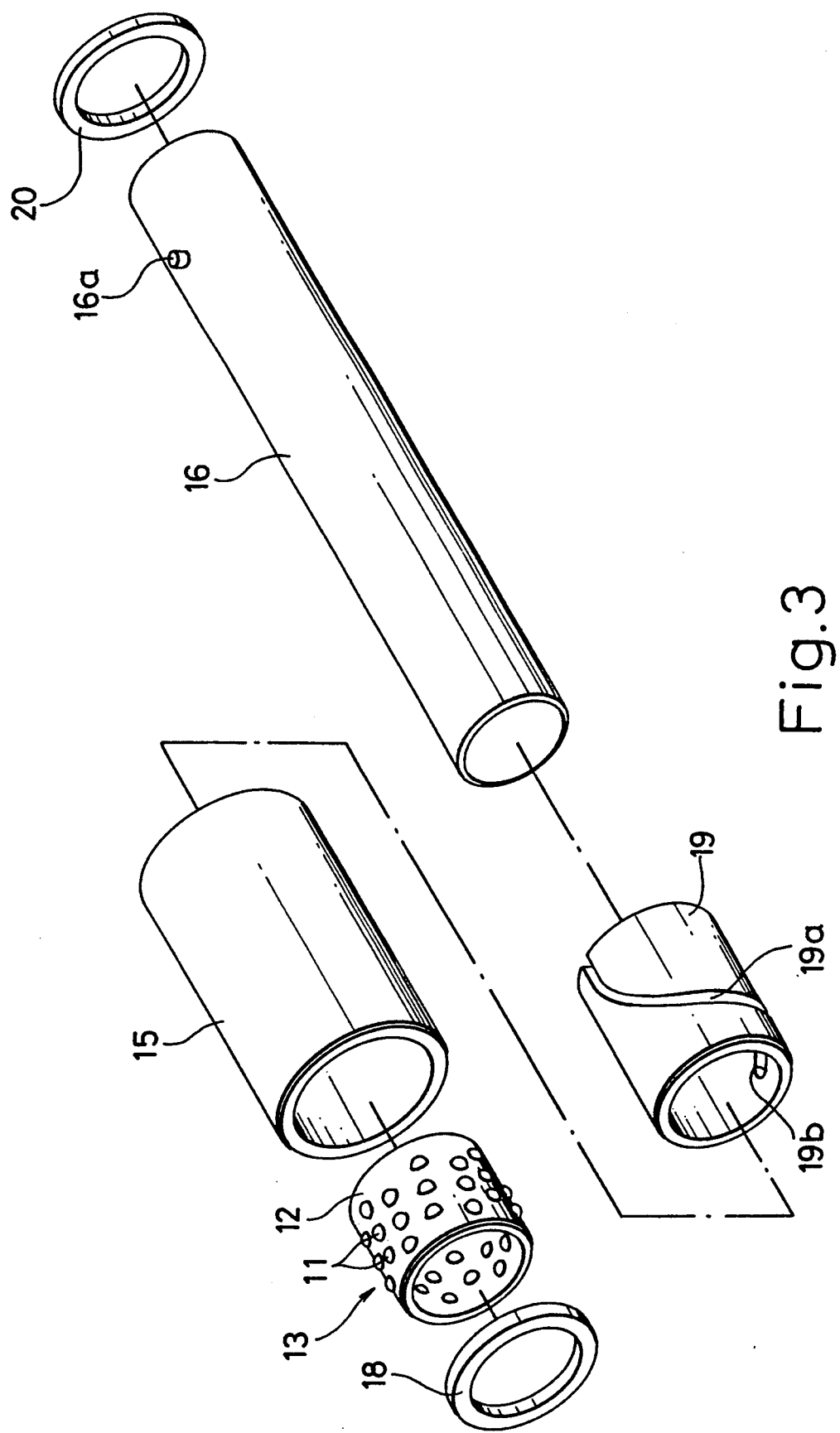
FIG. 3 is an exploded view of the stroke bearing as a first embodiment of the present invention.
Figure 4:
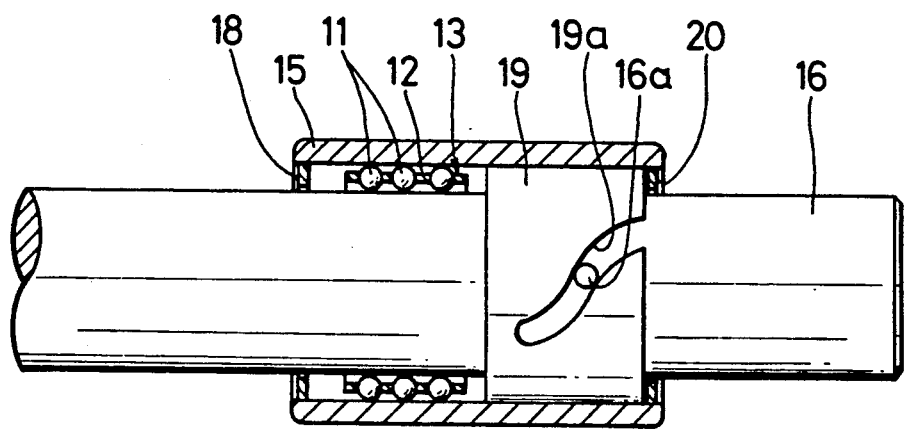
FIG. 4 is a lateral cross-sectional view of the essential elements of the stroke bearing indicated in FIG. 3.

FIG. 3 and FIG. 4 illustrate a stroke bearing that is a first embodiment of the present invention. As indicated in FIG. 3 and FIG. 4, ball and cage assembly 13 of this stroke bearing is comprised such that numerous rolling elements in the form of balls 11 made of steel etc., are held in position by cage 12. Cylindrical steel outer sleeve 15 and steel shaft 16, in the shape of a long column, are assembled in the manner in which they are engaged to slide and rotate freely by means of said ball and cage assembly 13. As indicated in FIG. 4, this ball and cage assembly 13 is arranged towards one end of outer sleeve 15. In addition, ball and cage assembly 13 is prevented from falling out by fitting stop ring 18 into one end of outer sleeve 15.

On the other hand, bushing 19 is solidly fit into the other end of outer sleeve 15, and said bushing does not make contact with shaft 16. Stop ring 20 is fit into the other end of this outer sleeve 15. Guide groove 19a is formed in bushing 19 in a helical shape along the axial direction of outer sleeve 15 and shaft 16. Pin 16a in the shape of a column is provided in the vicinity of the end of shaft 16 that slides into guide groove 19a. Furthermore, as indicated in FIG. 3, guide groove 19a has an opening on one end of bushing 19, and pin 16a is inserted into guide groove 19a through this opening.

The above-mentioned guide groove 19a and pin 16a comprise a guiding device that guides outer sleeve 15 and shaft 16 so as to perform relative motion along a prescribed path. Since this guide groove 19a is in the form of a helix, the resulting relative motion that is performed is helical motion. Furthermore, as indicated in FIG. 3, one end 19b of guide groove 19a is closed, and as is clear from FIG. 4, the other open end is blocked by stop ring 20. This therefore comprises a relative motion range limiting device that limits the range of the above-mentioned relative motion.

Furthermore, in the present embodiment, although bushing 19 is fit into outer sleeve 15 and guide groove 19a is formed in this bushing 19, an arrangement may also be employed wherein said guide groove is directly engraved in the inside surface of outer sleeve 15 omitting said bushing 19. However, as stated above, when an arrangement is employed wherein bushing 19 in which guide groove 19a is formed in advance is fit into outer sleeve 15, processing is easier than the arrangement wherein a guide groove is engraved in the inside surface of outer sleeve 15 as described above. In addition, in the present embodiment, although guide groove 19a is provided in outer sleeve 15 and pin 16a is formed in shaft 16, conversely, pin 16a can be formed on outer sleeve 15 and a guide groove can be formed in shaft 16. In addition, in the case of forming a guide groove in shaft 16, said guide groove may be directly formed in shaft 16, or the above-mentioned bushing 19 may be fit over shaft 16 and provided so as not to make contact with outer sleeve 15 while forming a guide groove in said bushing.

Figure 5:
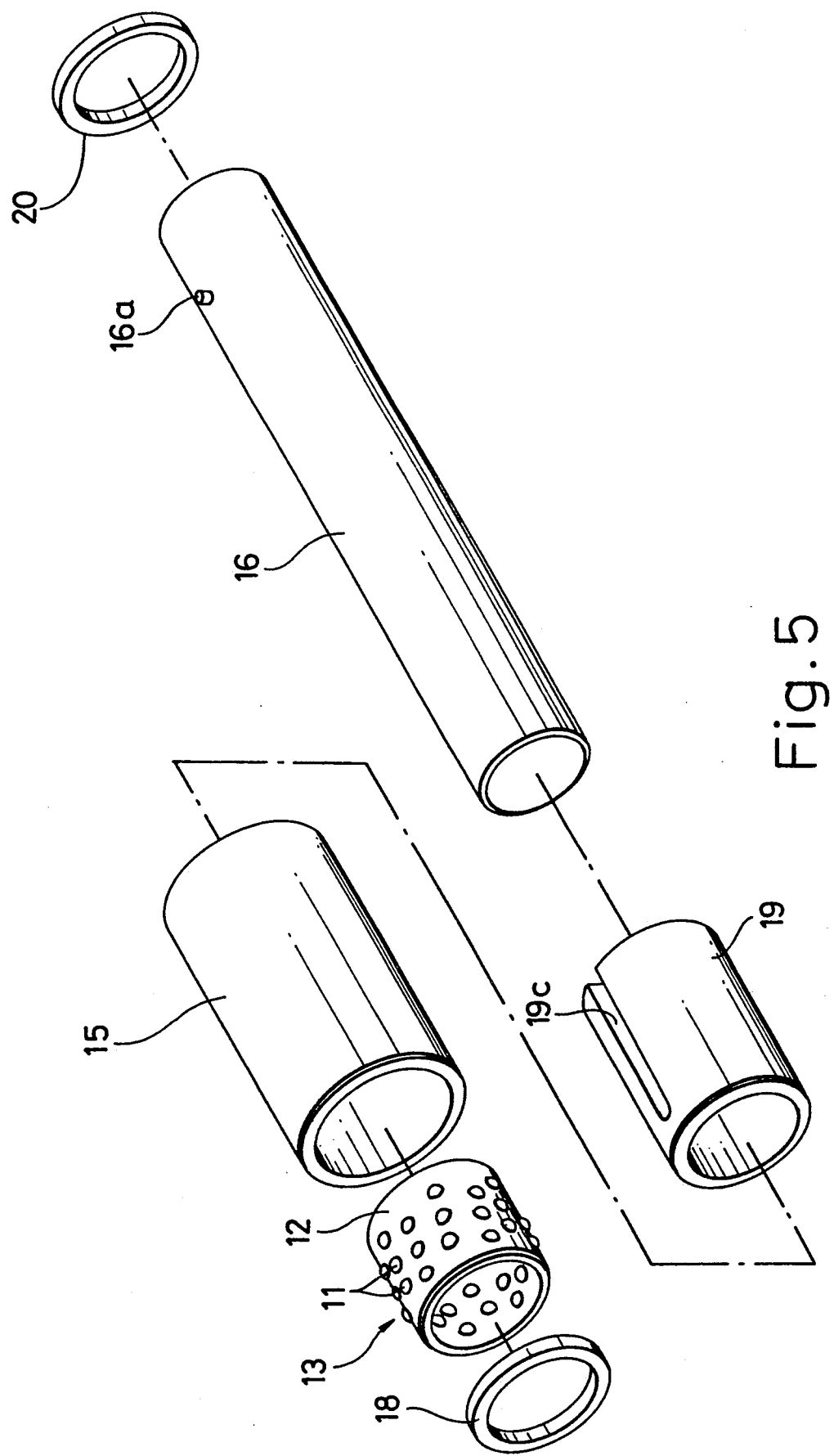
FIG. 5 is an exploded view of the stroke bearing as a second embodiment of the present invention.
Figure 6:
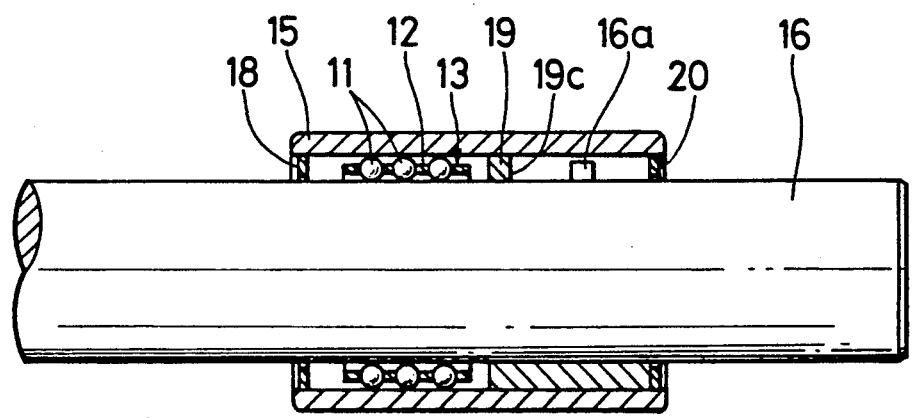
FIG. 6 is a lateral cross-sectional view of the essential elements of the stroke bearing indicated in FIG. 5.

FIG. 5 and FIG. 6 indicate a stroke bearing as a second embodiment of the present invention. Furthermore, as this stroke bearing is composed similar to the stroke bearing of the first embodiment indicated in FIG. 3 and FIG. 4 with the exception of those portions explained below, an explanation of that composition is omitted.

As indicated in FIG. 5 and FIG. 6, in this stroke bearing, guide groove 19c formed in bushing 19 that makes sliding contact with pin 16a of shaft 16 is formed linearly along the axial direction of outer sleeve 15 and shaft 16. In this arrangement, the relative motion of outer sleeve 15 and shaft 16 is linear motion.

Furthermore, in the first and second embodiments of the present invention, although guide grooves 19a and 19c, that compose the guiding device that performs relative guidance of outer sleeve 15 and shaft 16 together with pin 16a, are indicated for the cases of having helical and linear forms, respectively, other forms of the guide groove can also be suitably selected to have various arrangements such as, for example, a wave-like form or a combination of each of these forms.

According to the present invention as described above, since the path and range of relative motion of an outer sleeve and shaft can be set as desired by a guiding device and motion range limiting device contained therein, various forms of movement can be attained to accommodate complex movement of the apparatus thereby offering a first advantage of the present invention in the form of contributing to reduction of apparatus manufacturing costs. Also according to the present invention, a stroke bearing can be obtained that is able to prevent falling out of the ball and cage assembly using a simple arrangement without inhibiting motion characteristics, thereby offering a second advantage of the present invention.

What is claimed is:

1. A stroke bearing equipped with a guiding means for guiding an outer sleeve and a shaft to perform relative motion along a prescribed helical path, a motion range limiting means for limiting the range of the above-mentioned relative motion, in a stroke bearing comprising the above-mentioned outer sleeve, the above-mentioned shaft, a plurality of balls and a cage, wherein the above-mentioned outer sleeve and the above-mentioned shaft perform relative rolling motion in the axial and radial directions by means of the above-mentioned balls, wherein the above-mentioned guiding means comprises a bushing which is solidly fit into the above-mentioned outer sleeve, a guide groove provided in the above-mentioned bushing, and a pin that makes sliding contact within said guide groove provided on the above-mentioned shaft, and wherein the above-mentioned guide groove is formed in the shape of a helix along the axial direction of the above-mentioned outer sleeve and the above-mentioned shaft.

2. The stroke bearing of claim 1, further comprising stop rings, disposed at either end of said outer sleeve, for preventing said balls and cage from protruding out of said outer sleeve.

* * * * *